W. Britton,
Bolt Cutter.
N° 65,161.  Patented May 28, 1867.
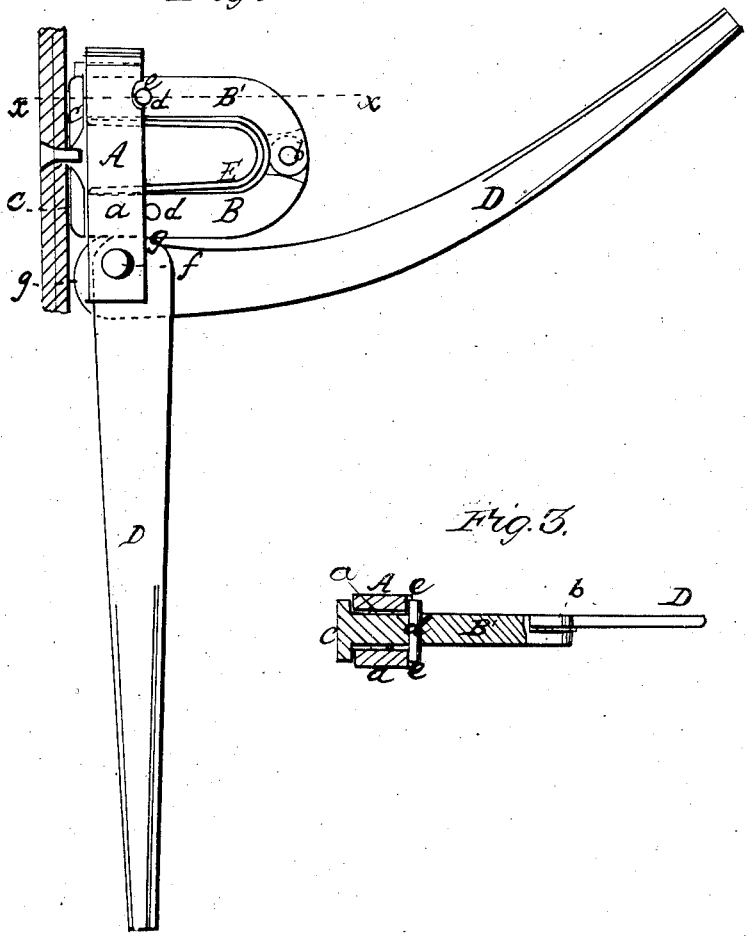
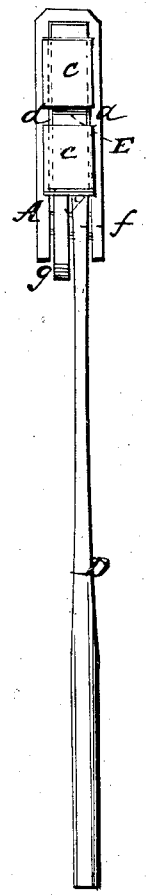
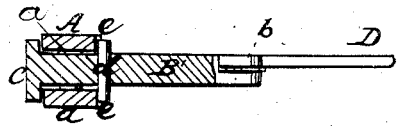
Witnesses:
Theo Fusche
Wm Treurn.
Inventor:
Walter Britton
Per [signature]
Attorney

United States Patent Office.

WALTER BRITTON, OF ABINGDON, ILLINOIS.

Letters Patent No. 65,161, dated May 28, 1867.

---

IMPROVED BOLT-CUTTER.

---

The Schedule referred to in these Letters Patent and making part of the same.

---

TO ALL WHOM IT MAY CONCERN:

Be it known that I, WALTER BRITTON, of Abingdon, in the county of Knox, and State of Illinois, have invented a new and improved Device for Cutting Bolts and Rivets; and I do hereby declare that the following is a full, clear, and exact description thereof, which will enable those skilled in the art to make and use the same, reference being had to the accompanying drawings, forming part of this specification.

This invention relates to a new and improved device for cutting bolts and rivets, and consists in a peculiar construction of parts, as hereinafter shown and described, whereby a very simple, portable, and efficient device is obtained for the purpose. In the accompanying sheet of drawings—

Figure 1 is a side view of my invention.

Figure 2 is an edge view of the same.

Figure 3, a section of the same, taken in the line $x\ x$, fig. 1.

Similar letters of reference indicate corresponding parts.

A, represents a metal guide, which is composed of a metal bar, bent in U-form, and having two parallel sides $a\ a$. Within this guide there are fitted two curved bars B B', which are connected by a pivot-bolt $b$ at one end, and have cutters, $c\ c$, at their opposite ends, the cutters lapping over the edges of the guide A; and each bar has a pin, $d$, passing through it at the inner edges of the guide, the pin of the bar B' fitting in notches, $e$, in the inner edges of the guide, as shown in fig. 1. In the open end of the guide A there are fitted two levers, D D, both being secured by one and the same pivot-bolt, $f$, the latter passing through the levers at such a point that an eccentric, $g$, will be at the end of each lever, said ends being rounded or made in semicircular form, as plainly shown in fig. 1. Between the two bars B B' there is placed a spring, E, which has a tendency to keep the cutters $c\ c$ apart, the ends of the spring bearing against the bars at their junction with the cutters.

From the above description it will be seen that, by forcing apart the levers D D, as shown in fig. 1, the cutters $c\ c$ will be spread apart under the influence of the spring E, and the implement is then adjusted to its work, so that the bolt or rivet to be cut (shown in red in fig. 1) will be between the cutters, and the two levers are then pressed towards each other, the eccentrics $g\ g$ acting against the bar B, and causing the cutters $c\ c$ to sever the bolt. By this arrangement of parts a very powerful leverage is obtained, as well as a very simple and portable device.

I claim as new, and desire to secure by Letters Patent—

The guide A, bars B B', connected by a pivot-bolt, $b$, at one end, and provided with cutters, $c\ c$, at the opposite end, and the levers D D, provided with eccentrics $g\ g$, all being combined and arranged substantially in the manner as and for the purpose set forth.

WALTER BRITTON.

Witnesses:
M. SHEAHAN,
THOS. G. IRWIN.